UNITED STATES PATENT OFFICE.

GEORGE NIMMO, OF JERSEY CITY, NEW JERSEY.

IMPROVEMENT IN THE MANUFACTURE OF CRUCIBLES.

Specification forming part of Letters Patent No. 49,141, dated August 1, 1865.

*To all whom it may concern:*

Be it known that I, GEORGE NIMMO, of Jersey City, in the county of Hudson and State of New Jersey, have invented, made, and applied to use a certain new and useful Improvement in Crucibles; and I do hereby declare the following to be a full, clear, and exact description of my said invention and the object attained by the same.

In the manufacture of crucibles from plumbago it is usual to make the entire pot or crucible of black lead, or a mixture of the same with other substances. In consequence of the carbon contained in said crucibles injury often arises to steel melted in them, in consequence of the steel absorbing carbon from the pots, and hence becoming changed in its character. The plumbago is indispensable in crucibles subjected to a high temperature, in consequence of its conducting powers, transmitting the heat from the outside to the contents. However, in crucibles and pots for melting brass and other metals requiring but a comparatively low temperature the principal injury results to the pot from the wear to which it is subjected in handling.

The nature of my said invention consists in a crucible or pot of plumbago with a lining or coating of clay, or clay and sand or similar cheap material free from carbon to prevent injury to the pots or injury to the contents of the pots or crucibles, whereby a cheaper and better pot or crucible is obtained, that is more durable than those made entirely of plumbago, and no injury results to the material fused in said pot or crucible.

I mold the pot or crucible, in any usual or desired manner, of plumbago, only thinner than those usually made, and I then apply a lining or coating of clay, or clay and sand or similar cheap substance free from carbon, said lining or coating being spread smoothly upon the surface of the plumbago and of the required thickness. The whole may then be pressed in a mold, dried, burned, and otherwise prepared for use. The crucible thus formed with either a lining within or an external coating is a compound crucible or pot of two materials—the plumbago and the clay in layers—and is a cheaper article and much better for some purposes than crucibles entirely of plumbago or a mixture of plumbago and other materials; and my said crucible is a new article of manufacture.

The shape of the crucible and its size may be varied, and the covers may also be lined or coated with clay.

What I claim, and desire to secure by Letters Patent, is—

A crucible or pot of plumbago with a lining or coating of clay or clay and sand or similar material, for the purposes and as specified.

In witness whereof I have hereunto set my signature this 20th day of June, A. D. 1865.

GEORGE NIMMO.

Witnesses:
CHAS. A. SMITH,
JAS. E. SERRELL, Jr.